US011181786B2

(12) United States Patent
Ito

(10) Patent No.: US 11,181,786 B2
(45) Date of Patent: Nov. 23, 2021

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Higashihiroshima (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/168,102

(22) Filed: Feb. 4, 2021

(65) Prior Publication Data
US 2021/0247640 A1 Aug. 12, 2021

(30) Foreign Application Priority Data

Feb. 6, 2020 (JP) .............................. JP2020-018472

(51) Int. Cl.
G02F 1/1339 (2006.01)
G02F 1/1343 (2006.01)
G02F 1/1337 (2006.01)
G02F 1/1333 (2006.01)

(52) U.S. Cl.
CPC ........ *G02F 1/13398* (2021.01); *G02F 1/1337* (2013.01); *G02F 1/133345* (2013.01); *G02F 1/134309* (2013.01); *G02F 2201/50* (2013.01)

(58) Field of Classification Search
None
See application file for complete search history.

(56) References Cited

U.S. PATENT DOCUMENTS

| 4,820,611 A * | 4/1989 | Arnold, III ............. G03F 7/091 430/271.1 |
| 5,181,132 A * | 1/1993 | Shindo .............. G02F 1/133512 349/155 |
| 6,573,969 B1 | 6/2003 | Watanabe et al. |
| 2010/0097548 A1* | 4/2010 | Koito .................... G06F 3/0412 349/113 |
| 2016/0054611 A1* | 2/2016 | Zhao ................... G02F 1/13394 257/72 |
| 2017/0010496 A1* | 1/2017 | Shim ................... G02F 1/13394 |

(Continued)

FOREIGN PATENT DOCUMENTS

| JP | 2001027762 | 1/2001 |
| JP | 2003084290 | 3/2003 |

(Continued)

*Primary Examiner* — Phu Vu
(74) *Attorney, Agent, or Firm* — JCIPRNET

(57) ABSTRACT

The electro-optical device includes a first substrate including a plurality of pixel electrodes, a second substrate facing the first substrate, and an electro-optical layer disposed between the first substrate and the second substrate. The first substrate is provided with a spacer protruding from a position overlapping with a portion between adjacent pixel electrodes toward the second substrate, and an insulating protective film is provided between the spacer and the pixel electrode. The spacer is made of a metal material such as titanium nitride, and a surface of the spacer is covered with an insulating film. A first oriented film overlaps the spacer with the insulating film interposed therebetween. The first substrate is formed with a recessed portion that is recessed toward a substrate body, and a root portion of the spacer is embedded in the recessed portion.

11 Claims, 13 Drawing Sheets

(56) References Cited

U.S. PATENT DOCUMENTS

2019/0162996 A1 5/2019 Tominaga
2019/0163024 A1 5/2019 Tominaga

FOREIGN PATENT DOCUMENTS

| JP | 2006301476 | 11/2006 |
| JP | 2019101095 | 6/2019 |
| JP | 2019101548 | 6/2019 |

* cited by examiner

ELECTRO-OPTICAL DEVICE AND ELECTRONIC APPARATUS

The present application is based on, and claims priority from JP Application Serial Number 2020-018472, filed Feb. 6, 2020, the disclosure of which is hereby incorporated by reference herein in its entirety.

BACKGROUND

1. Technical Field

The present disclosure relates to an electro-optical device and an electronic apparatus.

2. Related Art

A transmissive electro-optical device used such as a light valve of a projection display device includes a first substrate including pixel electrodes, a second substrate including a common electrode, and a liquid crystal layer disposed between the first substrate and the second substrate. In such an electro-optical device, it has been proposed to arrange resin spacers between the first substrate and the second substrate in order to make the distance between the first substrate and the second substrate uniform (see JP-A-2003-84290). However, when the resin spacer is used, there are problems such as deterioration of the liquid crystal layer due to the dissolution of the resin component from the spacer.

On the other hand, it has been proposed to arrange a spacer formed of an inorganic insulating film between the first substrate and the second substrate so that the spacer does not overlap with the pixel electrode (see JP-A-2006-301476).

Since the inorganic insulating film has translucency, when the spacer is formed of the inorganic insulating film, the light that has entered the inside of the inorganic insulating film is reflected at the interface between the side surface of the inorganic insulating film and the liquid crystal layer, and is emitted in a specific angle direction. As a result, there is a problem that the contrast of the image is lowered. Therefore, in the configuration described in JP-A-2006-301476, when the spacer is formed of the inorganic material, there is a problem that it is difficult to avoid that the light entering the inside of the spacer affects the image.

SUMMARY

In order to solve the above-described problems, an aspect of an electro-optical device according to the present disclosure includes a first substrate including a plurality of pixel electrodes, a second substrate facing the first substrate, an electro-optical layer disposed between the first substrate and the second substrate, a spacer made of a metal material protruding, at a position overlapping with a portion between adjacent pixel electrodes among the plurality of pixel electrodes on one substrate of the first substrate and the second substrate, toward another substrate, and an insulating film covering a surface of the spacer.

The electro-optical device according to an aspect of the present disclosure can be used for various electronic apparatuses. When the electronic apparatus is a projection display device, the electronic apparatus includes an illumination optical system that emits illumination light incident on the electro-optical device, and a projection optical system that projects the modulated light emitted from the electro-optical device.

DESCRIPTION OF EXEMPLARY EMBODIMENTS

Figure 1:
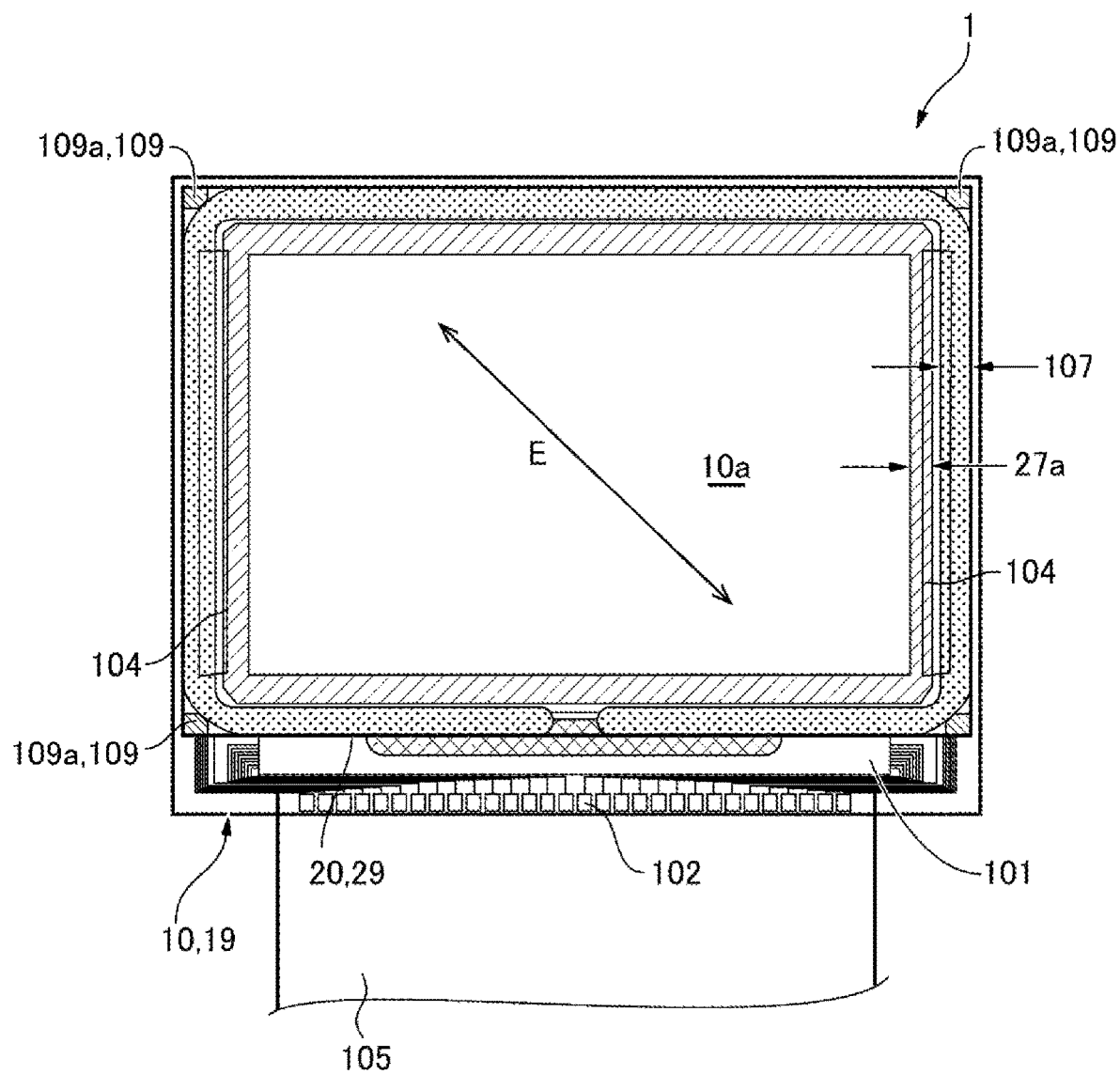
FIG. 1 is a plan view illustrating an aspect of an electro-optical device to which the present disclosure is applied.

Exemplary embodiments of the present disclosure will now be described herein with reference to the accompanying drawings. Note that, in each of the figures to be referred to in the following description, to illustrate each layer, each member, and the like in a recognizable size in the drawings, each layer, each member, and the like are illustrated at a different scale. Further, in the following description, when a layer formed on a first substrate 10 is described, the upper layer side or the front surface side means the side (the side on which a second substrate 20 is located) opposite to the side on which a substrate body 19 is located, and the lower layer side means the side on which the substrate body 19 is located.

Exemplary Embodiment 1

1. Overall Configuration

Figure 2:
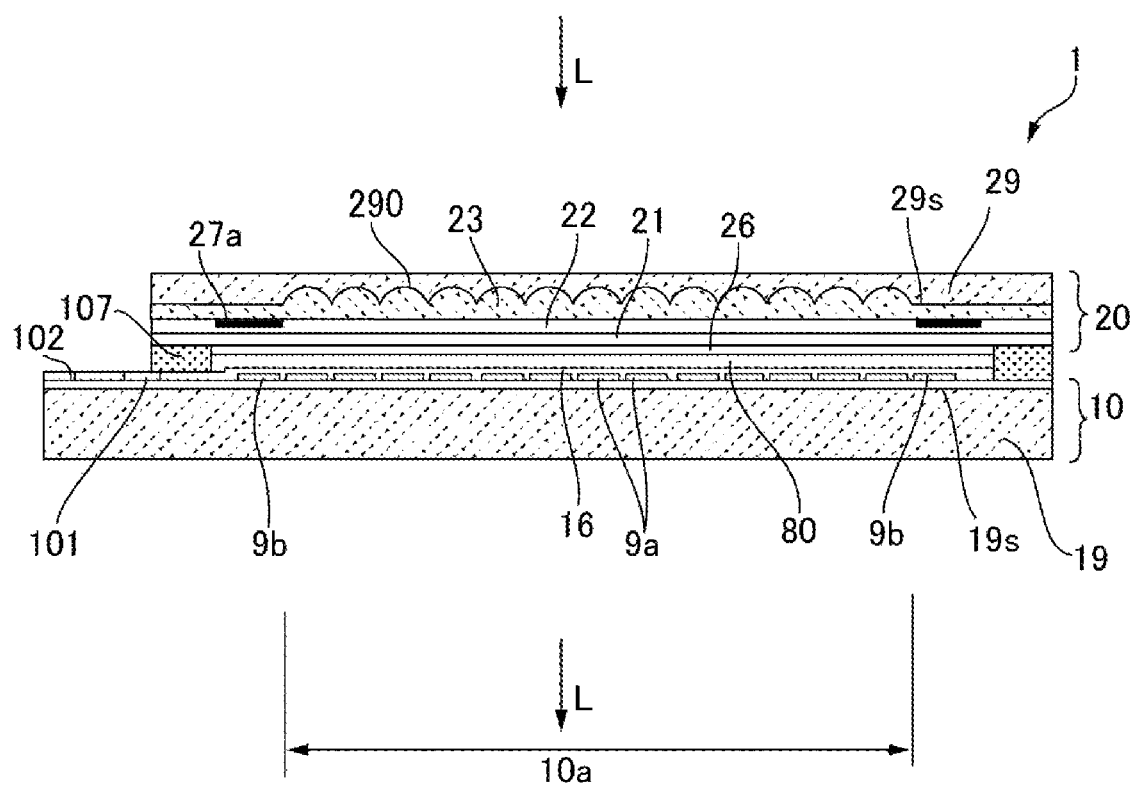
FIG. 2 is an explanatory view schematically illustrating a cross section of the electro-optical device according to Exemplary Embodiment 1 of the present disclosure.

FIG. 1 is a plan view illustrating an aspect of an electro-optical device 1 to which the present disclosure is applied, and illustrates a state in which the electro-optical device 1 is viewed from the second substrate 20 side. FIG. 2 is an explanatory view schematically illustrating a cross section of the electro-optical device 1 according to Exemplary Embodiment 1 of the present disclosure.

As illustrated in FIG. 1 and FIG. 2, in the electro-optical device 1, the first substrate 10 and the second substrate 20 are bonded together by a sealing material 107 with a predetermined gap interposed therebetween, and the first substrate 10 and the second substrate 20 face each other. The sealing material 107 is provided in a frame shape along the outer edge of the second substrate 20, and an electro-optical layer 80 formed of a liquid crystal layer is provided in a region surrounded by the sealing material 107 between the first substrate 10 and the second substrate 20. The sealing material 107 is a photocurable adhesive, or a photocurable and thermosetting adhesive. The first substrate 10 and the second substrate 20 both have a quadrangle shape, and a display area 10a is provided as a quadrangular area in a substantially central portion of the electro-optical device 1. In accordance with such a shape, the sealing material 107 is also provided in a frame shape forming a substantially quadrangular shape.

The first substrate 10 includes a substrate body 19 formed of a quartz substrate, a glass substrate, or the like as the substrate body. On one surface 19s side of the substrate body 19, which is the second substrate 20 side, on an outer side of the display area 10a, a data line driving circuit 101 and a plurality of terminals 102 are formed along one side of the first substrate 10. A scanning line driving circuit 104 is formed along other sides adjacent to the one side. A flexible wiring substrate 105 is coupled to the terminals 102, and various potentials and various signals are input to the first substrate 10 via the flexible wiring substrate 105. In the display area 10a on the one surface 19s of the substrate body 19, the plurality of translucent pixel electrodes 9a, which are formed of indium tin oxide (ITO) films or the like, and switching elements (not illustrated in FIG. 2) electrically coupled to the respective plurality of pixel electrodes 9a are formed in a matrix pattern. A first oriented film 16 is formed on the second substrate 20 side with respect to the pixel electrodes 9a, and the pixel electrodes 9a are covered with the first oriented film 16. Accordingly, a portion from the substrate body 19 to the first oriented film 16 corresponds to the first substrate 10.

The second substrate 20 includes a substrate body 29 formed of a quartz substrate, a glass substrate, or the like as the substrate body. On one surface 29s side, which faces the first substrate 10, of the substrate body 29, a light-transmitting common electrode 21 formed of an ITO film or the like, is formed. A second oriented film 26 is formed on the first substrate 10 side with respect to the common electrode 21. The common electrode 21 is formed on a substantially entire surface of the substrate body 29, and covered with the second oriented film 26. Accordingly, a portion from the substrate body 29 to the second oriented film 26 corresponds to the second substrate 20.

A light shielding member 27a made of a resin, metal, or metal compound is formed between the substrate body 29 and the common electrode 21. The light shielding member 27a is a parting extending along an outer edge of the display area 10a. A protective film 22 is formed between the light shielding member 27a and the common electrode 21. The first substrate 10 includes a dummy pixel electrode 9b that is simultaneously formed with the pixel electrodes 9a is formed in a region overlapping the light shielding member 27a in plan view.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is disposed in the inter-substrate conduction electrode 109. The common electrode 21 of the second substrate 20 is electrically coupled to the first substrate 10 side via the inter-substrate conduction material 109a and the inter-substrate conduction electrode 109. Therefore, a common potential is applied to the common electrode 21 from the first substrate 10 side.

The first oriented film 16 and the second oriented film 26 are formed of inorganic alignment films, which are diagonally vapor-deposited films such as $SiO_x$ ($x \leq 2$), $TiO_2$, MgO, or $Al_2O_3$. Accordingly, the first oriented film 16 and the second oriented film 26 are formed of columnar structure layers in which columnar bodies named columns are obliquely formed with respect to the first substrate 10 and the second substrate 20. Thus, the first oriented film 16 and the second oriented film 26 orient the liquid crystal molecules 80a having negative dielectric anisotropy used in the electro-optical layer 80 diagonally with respect to the first substrate 10 and the second substrate 20, thereby pre-tilting the liquid crystal molecules 80a. While no voltage is applied between each of the pixel electrodes 9a and the common electrode 21, a pre-tilt angle is represented by an angle formed between a vertical direction with respect to the first substrate 10 and the second substrate 20 and a long axis direction (oriented direction) of the liquid crystal molecules 80a. In the embodiment, the pre-tilt angle is, for example, 5°.

In this way, the electro-optical device 1 is configured as an electro-optical device employing a vertical alignment (VA) mode. In such an electro-optical device 1, when a voltage is applied between the pixel electrode 9a and the common electrode 21, the liquid crystal molecules 80a tilted in the pre-tilt direction tilt with respect to the first substrate 10 and the second substrate 20 in a direction that reduces the tilt angle. Such a tilting direction corresponds to a direction in which the display is in a so-called bright state. In the embodiment, as illustrated in FIG. 1, when the side to which the flexible wiring substrate is coupled is the 6 o'clock direction of the clock, the oriented direction (direction toward the bright state) of the liquid crystal molecules 80a is a direction from 4:30 toward 10:30 of the clock as illustrated by the arrow E, in plan view.

In the electro-optical device 1 of the embodiment, the pixel electrodes 9a and the common electrode 21 are formed of the transmissive conductive film such as an ITO film, and the electro-optical device 1 is constituted as a transmissive electro-optical device. In the transmissive electro-optical device 1, while being incident on the electro-optical layer 80 from one substrate of the first substrate 10 and the second substrate 20 and being emitted through the other substrate, the light is modulated so as to display an image. In the exemplary embodiment, as illustrated by the arrow L, while being incident on the electro-optical layer 80 from the first substrate 10 and emitted through the second substrate 20, the light is modulated so as to display an image. Accordingly, the first substrate 10 is provided at the incident side of the light, and the second substrate 20 faces the first substrate 10 on the light emitting side.

In the electro-optical device 1 configured in this manner, lenses may be configured to face the pixel electrodes 9a on at least one of the first substrate 10 and the second substrate 20. In the embodiment, the lenses are configured on the second substrate 20. More specifically, in the second substrate 20, curved surfaces 290 recessed on a side of the one surface 29s of the substrate body 29 toward the side opposite to the electro-optical layer 80 are provided at positions overlapping with the pixel electrodes 9a in plan view. The curved surfaces 290 are covered with a lens layer 23. The substrate body 29 is a quartz substrate, and the substrate body 29 has a refractive index of 1.48. The lens layer 23 is silicon oxynitride (SiON) and the refractive index of the lens layer 23 is 1.58 to 1.68. Thus, the curved surface 290 constitutes a lens having positive power.

2. Electrical Configuration

Figure 3:
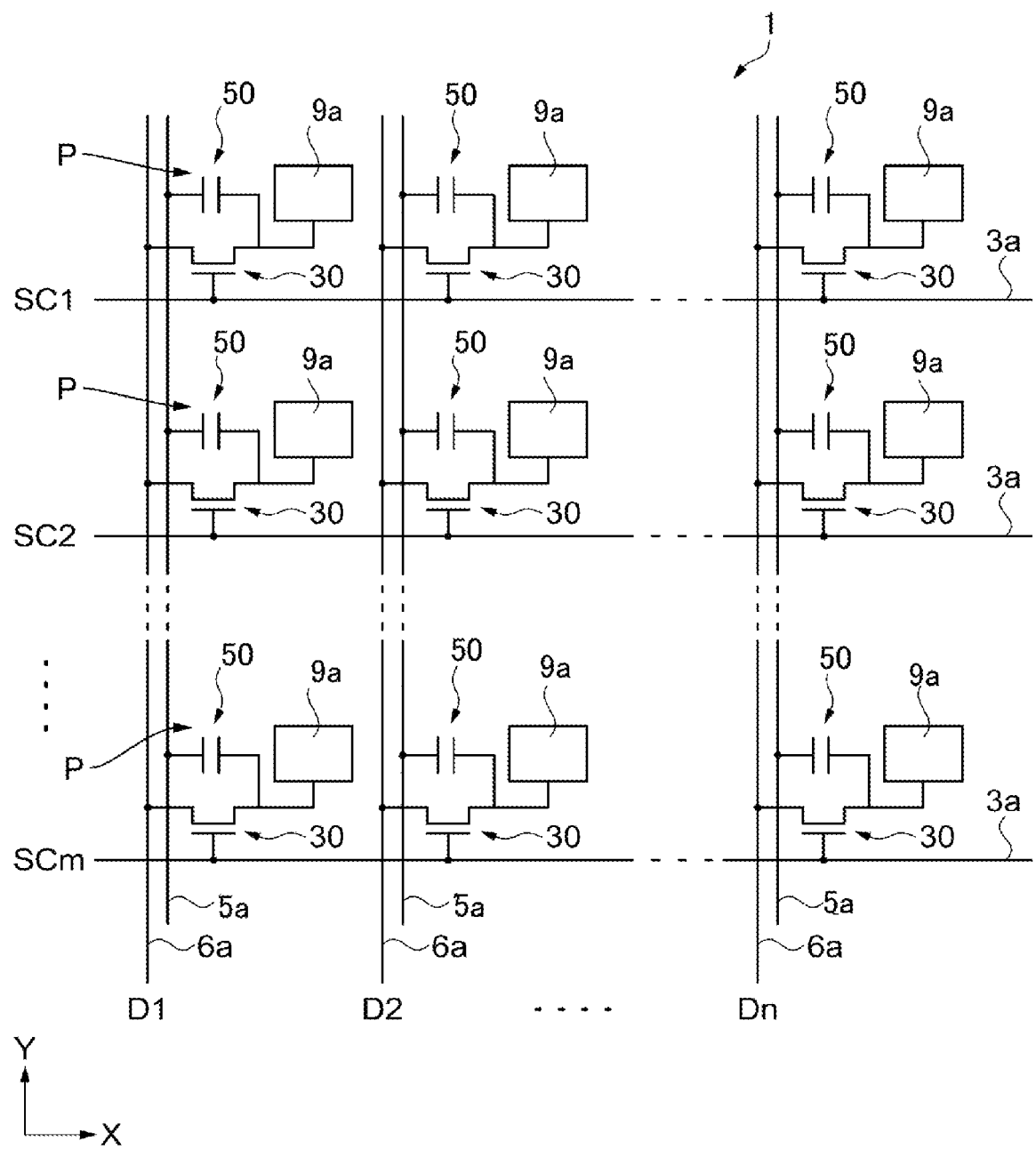
FIG. 3 is an explanatory view illustrating an electrical configuration of the electro-optical device illustrated in FIG. 1.

FIG. 3 is an explanatory view illustrating an electrical configuration of the electro-optical device 1 illustrated in FIG. 1. As illustrated in FIG. 3, the electro-optical device 1 includes a plurality of scanning lines 3a extending in the X-axis direction and a plurality of data lines 6a extending in the Y-axis direction, at least in the display area 10a. The scanning lines 3a and the data lines 6a are in a state of being insulated from each other on the first substrate 10. In the exemplary embodiment, the first substrate 10 includes capacitance lines 5a that extend along the scanning lines 3a and the data lines 6a. In addition, the pixel P is provided to correspond to each of intersections between the plurality of scanning lines 3a and the plurality of data lines 6a. Each of the plurality of pixels P includes the pixel electrode 9a, a switching element 30, and a storage capacitor 50. The scanning line 3a is electrically coupled to a gate of the switching element 30, and the data line 6a is electrically coupled to a source of the switching element 30. The pixel electrode 9a is electrically coupled to a drain of the switching element 30.

The data lines 6a are coupled to the data line driving circuit 101 illustrated in FIG. 1, and supply image signals D1, D2, . . . , and Dn, which are supplied from the data line driving circuit 101, to the respective pixels P. The scanning lines 3a are coupled to the scanning line driving circuit 104 illustrated in FIG. 1, and sequentially supply scanning signals SC1, SC2, . . . , and SCm, which are supplied from the scanning line driving circuit 104, to the respective pixels P. The image signals D1 to Dn supplied from the data line driving circuit 101 to the data lines 6a may be line-sequentially supplied in this order, or may be supplied to the plurality of data lines 6a adjacent to one another in groups. The scanning line driving circuit 104 line-sequentially supplies the scanning signals SC1 to SCm to the scanning lines 3a at predetermined timings.

In the electro-optical device 1, during a period in which the switching elements 30 are turned on by inputs of the scanning signals SC1 to SCm, the image signals D1 to Dn supplied from the data lines 6a are written into the pixel electrodes 9a at predetermined timings. The image signals D1 to Dn at a predetermined level written into the electro-optical layer 80 via the pixel electrodes 9a are maintained between the pixel electrodes 9a and the common electrode 21, which is arranged to face the pixel electrodes 9a with the electro-optical layer 80 interposed therebetween, for a certain period. The frequency of the image signals D1 to Dn is 60 Hz, for example. In the exemplary embodiment, in order to prevent the image signals D1 to Dn maintained between the pixel electrodes 9a and the electro-optical layer 80 from leaking, the storage capacitors 50 are coupled in parallel with liquid crystal capacitors formed between the pixel electrodes 9a and the common electrode 21. The storage capacitor 50 is provided between the drain of the switching element 30 and the capacitance line 5a.

3. Specific Configuration of Pixel

Figure 4:
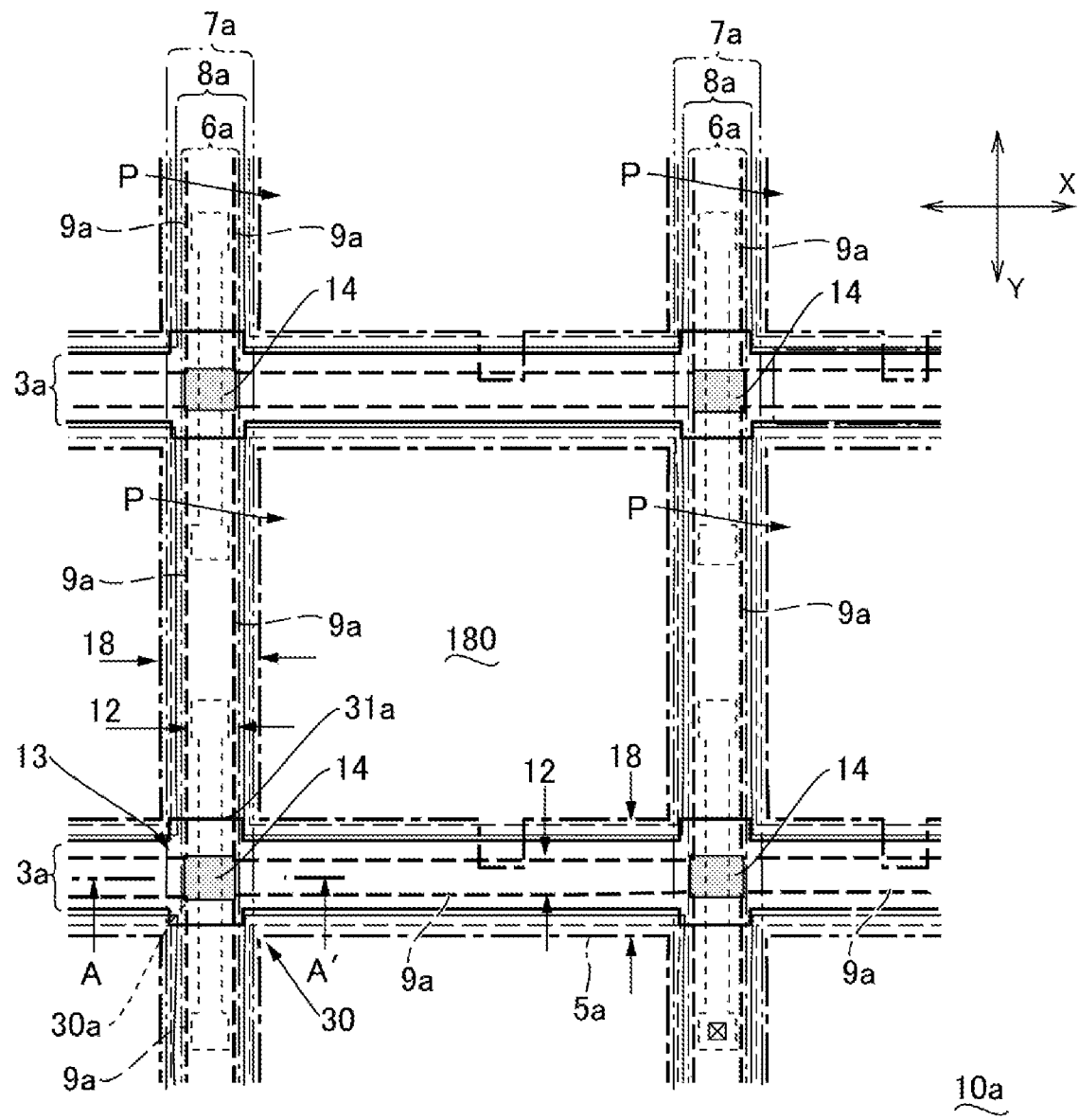
FIG. 4 is a plan view of a plurality of pixels adjacent to each other in the electro-optical device illustrated in FIG. 1.
Figure 5:
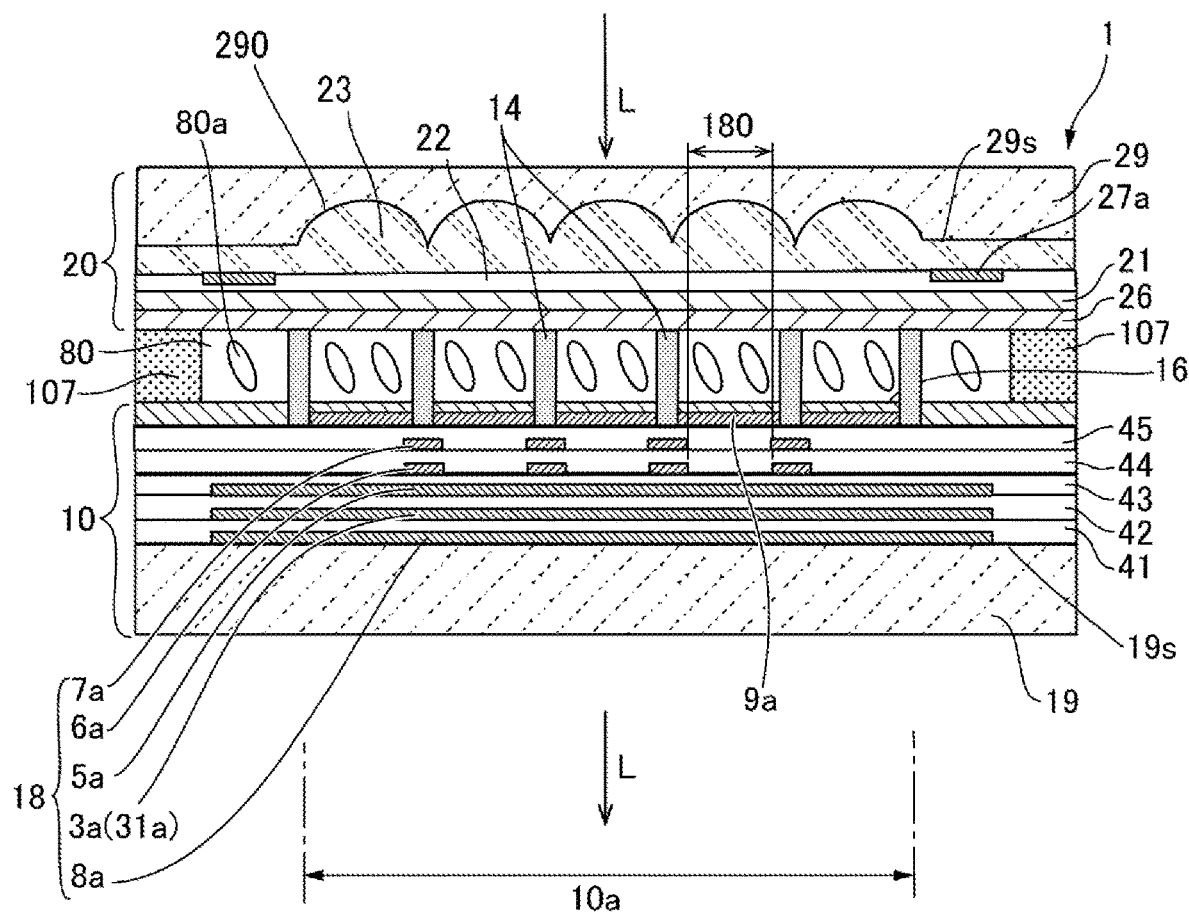
FIG. 5 is an explanatory view schematically illustrating an enlarged part of the cross section illustrated in FIG. 2.

FIG. 4 is a plan view of a plurality of adjacent pixels in the electro-optical device 1 illustrated in FIG. 1. FIG. 5 is an explanatory view schematically illustrating an enlarged part of the cross section illustrated in FIG. 2. Note that, in FIG. 4, only a semiconductor layer 30a of the switching element 30, light shielding layers 7a and 8a, the scanning line 3a, the data line 6a, the capacitance line 5a, and the pixel electrode 9a are illustrated by the lines described below, and a relay electrode, a capacitance electrode, and a contact hole are not illustrated. Further, in FIG. 4, for the layers whose ends overlap in plan view, the positions of the ends are shifted for easy understanding of shapes of the layers and the like.

Light shielding layer 8a: thin and long dashed line
Semiconductor layer 30a: thin and short dotted line
Scanning line 3a: thick solid line
Data line 6a: thin one-dot chain line
Capacitance line 5a: thick one-dot chain line
Light shielding layer 7a: thin two-dot chain line
Pixel electrode 9a: thick dashed line As illustrated in FIG. 4 and FIG. 5, on a surface of the first substrate 10 facing the second substrate 20, the pixel electrode 9a is formed in each of the plurality of pixels, and the data line 6a and the scanning line 3a are formed along an inter-pixel region 12, which is interposed between the adjacent pixel electrodes 9a. There are the inter-pixel regions 12 extending lengthwise and the inter-pixel regions 12 extending crosswise. The scanning line 3a linearly extends along a first inter-pixel region, which extends in an X direction, of the inter-pixel regions 12 and the data line 6a linearly extends along a second inter-pixel region, which extends in a Y direction, of the inter-pixel regions 12. The switching element 30 is formed in correspondence with intersection of the data line 6a and the scanning line 3a, and in the embodiment, the switching element 30 is formed by utilizing intersection region 13 where the data line 6a and the scanning line 3a intersect and the vicinity of the intersection region 13. The capacitance line 5a is formed on the first substrate 10, and the common potential is applied to the capacitance line 5a as the constant potential. The capacitance line 5a extends so as to overlap the scanning line 3a and the data line 6a, and are formed to have a lattice shape. On a lower layer side of the switching element 30, the light shielding layer 8a is formed, and the light shielding layer 8a extends in a lattice shape so as to overlap the scanning line 3a and the data line 6a. On an upper layer side of the switching element 30, the light shielding layer 7a is formed, and the light shielding layer 7a extends so as to overlap the data line 6a. The common potential is applied to the light shielding layer 7a as the constant potential.

The interlayer insulating films 41, 42, 43, 44, and 45 are layered in this order at the one surface 19s located on the electro-optical layer 80 side of the substrate body 19. The light shielding layers 8a are formed between the substrate body 19 and the interlayer insulating film 41. The light shielding layer 8a is formed of a light shielding conductive film such as a metal silicide film, a metal film, or a metal compound film. The light shielding layer 8a extends along the scanning line 3a and the data line 6a between the substrate body 19 and the switching element 30, and has an opening portion in a region overlapping the pixel electrode 9a in plan view. The light shielding layer 8a is made of tungsten silicide (WSi), tungsten, titanium nitride, or the like, and prevents light incident on the first substrate 10 from entering the semiconductor layer 30a described later and causing a malfunction in the switching element 30 due to photocurrent. The light shielding layer 8a may be configured as the scanning line. In this case, a gate electrode 31a described later and the light shielding layer 8a are configured to be electrically coupled.

The switching elements 30 are formed between the interlayer insulating film 41 and the interlayer insulating film 42. The switching element 30 includes the semiconductor layer 30a and the gate electrode 31a extending in a direction orthogonal to a longitudinal direction of the semiconductor layer 30a and overlapping a central portion of the semiconductor layer 30a in the longitudinal direction. In the embodiment, the gate electrode 31a is configured by a part of the scanning line 3a. The gate electrode 31a and the scanning line 3a are formed of light shielding conductive films including a metal silicide film, a metal film, a metal compound film, or the like.

The capacitance lines 5a are provided between the interlayer insulating film 42 and the interlayer insulating film 43, and a drain electrode (not illustrated) faces the capacitance line 5a with a dielectric layer interposed therebetween to form the storage capacitor 50. The capacitance line 5a is formed of a light shielding conductive film including a metal silicide film, a metal film, a metal compound film, or the like.

The data lines 6a are formed between the interlayer insulating film 43 and the interlayer insulating film 44, and the data line 6a is electrically coupled to the source of the semiconductor layer 30a through the contact hole (not illustrated) that passes through the interlayer insulating films 42 and 43. The data line 6a is formed of a light shielding conductive film including a metal silicide film, a metal film, a metal compound film, or the like.

The light shielding layers 7a are formed between the interlayer insulating film 44 and the interlayer insulating film 45. The light shielding layer 7a is formed of a light shielding conductive film including a metal silicide film, a metal film, a metal compound film, or the like. The common potential is applied to the light shielding layer 7a as the constant potential, and also functions as a shielding layer. Note that the light shielding layer 7a may be configured as the capacitance line.

The pixel electrodes 9a formed of an ITO film or the like are formed on the upper layer side of the interlayer insulating film 45, and the pixel electrode 9a is electrically coupled to the drain electrode (not illustrated). The interlayer insulating film 45 includes a flattened surface. The first oriented film 16 is formed on the surface side of the pixel electrodes 9a. Note that a protective layer formed of boron-doped silicate glass (BSG) film may be formed between the interlayer insulating film 45 and the pixel electrodes 9a.

4. Configuration of Columnar Spacer 14

Figure 6:
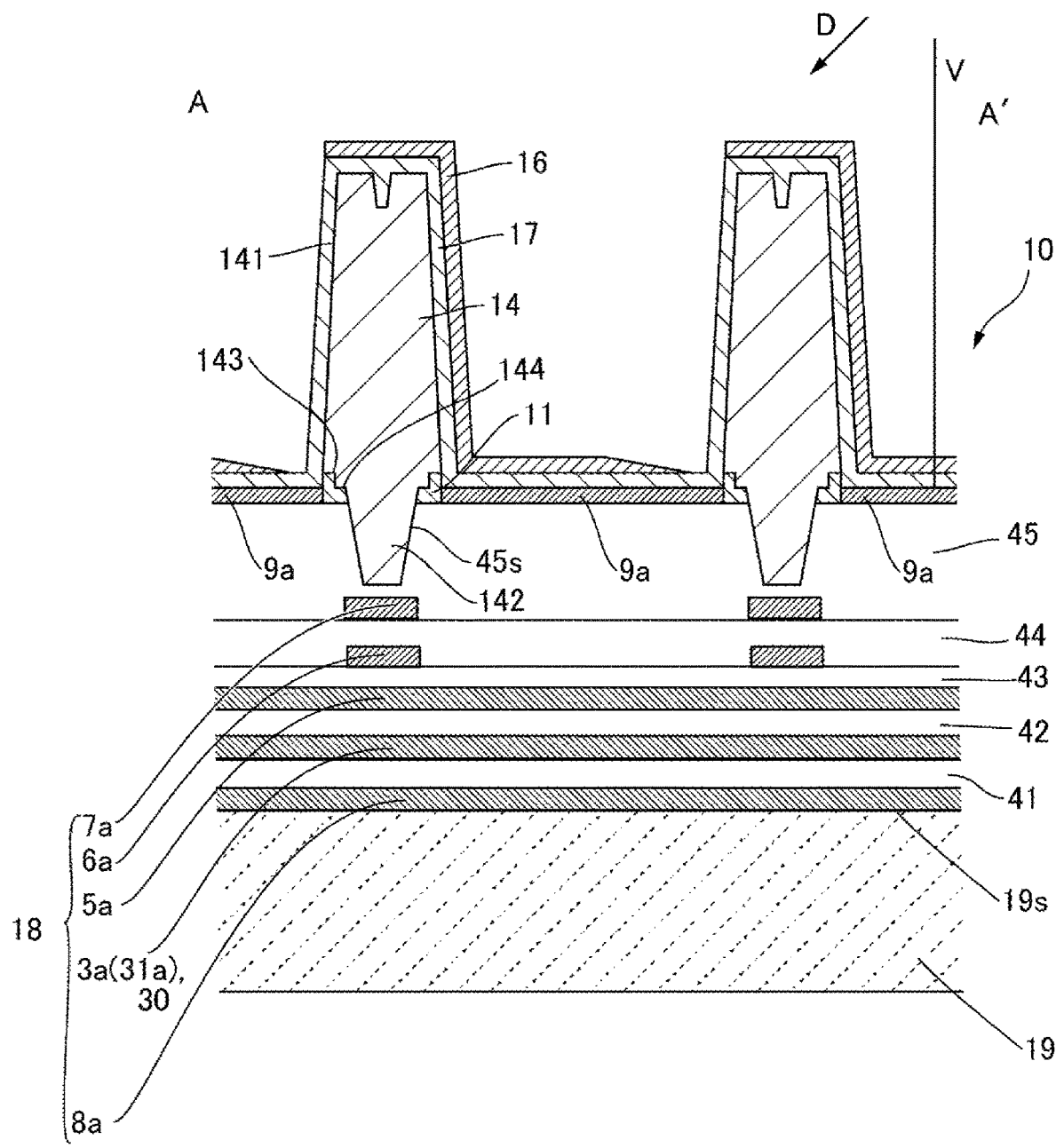
FIG. 6 is an enlarged explanatory view of a spacer illustrated in FIG. 5.

FIG. 6 is an explanatory view schematically illustrating a cross section taken along the line A-A' of FIG. 4. FIG. 6 is an enlarged explanatory view of a spacer 14 illustrated in FIG. 5. As illustrated in FIG. 4 and FIG. 5, on one substrate of the first substrate 10 and the second substrate 20, at a position overlapping an inter-pixel region interposed between the adjacent pixel electrodes 9a, a columnar spacer 14 made of a metal material protruding toward another substrate is formed. In the embodiment, the spacer 14 is formed on the first substrate 10 at a position corresponding to the intersection region 13 in the inter-pixel region 12. Therefore, the spacer 14 faces the region surrounded by the four curved surfaces 290 among the plurality of curved surfaces 290 illustrated in FIG. 2. In the embodiment, a side surface 141 of the spacer 14 is a tapered surface such that a root side is thicker than a tip side.

The spacer 14 is made of a metal material. Thus, as illustrated in FIG. 6, an insulating film 17 made of silicon oxide, silicon nitride, or the like that covers the surface of the spacer 14 is formed on the first substrate 10, and the first oriented film 16 overlaps the spacer 14 with the insulating film 17 interposed therebetween. The insulating film 17 is, for example, a film formed by vapor depositing silicon oxide or the like from a normal line V direction perpendicular to the first substrate 10. Therefore, the insulating film 17 covers the spacer 14 and is also formed on the surface of the pixel electrode 9a. On the other hand, as illustrated by the arrow D, the first oriented film 16 is formed by diagonal vapor deposition from a direction inclined with respect to the normal line V of the first substrate 10 and from a direction along the arrow E in FIG. 1. Therefore, the first oriented film 16 may be thinly formed or not formed at all on the side surface of the spacer 14, which is an opposite side to the vapor deposition direction, among the side surfaces of the spacer 14, and on a portion behind the spacer 14. In the embodiment, at least the surface of the spacer 14 is made of a low-reflection material. For example, the spacer 14 is made of titanium nitride, and the titanium nitride has a low reflectance.

The first substrate 10 is formed with a recessed portion 45s that is recessed toward the substrate body 19 at a position overlapping the spacer 14 in plan view, and the root portion 142 of the spacer 14 is embedded in the recessed portion 45s. In the embodiment, the spacer 14 is formed so that the edges of the spacer 14 and the pixel electrode 9a overlap each other in plan view. However, the spacer 14 may be formed so as to overlap an end portion of the pixel electrode 9a. In such a case, an insulating protective film 11 made of aluminum oxide or the like is provided between the spacer 14 and the pixel electrode 9a. In the embodiment, the portion of the spacer 14 adjacent to the pixel electrode 9a on the tip side with respect to the root portion 142 that is located inside the recessed portion 45s is thicker than the root portion 142. Therefore, between the root portion 142 and the portion adjacent to the pixel electrode 9a on the tip side, step portions 143 and 144 that protrude from the root portion 142 in two steps are formed, and the insulating protective film 11 is provided so as to fill between the step portions 143 and 144 and the pixel electrode 9a.

5. Method for Manufacturing Columnar Spacer 14

Figure 7:
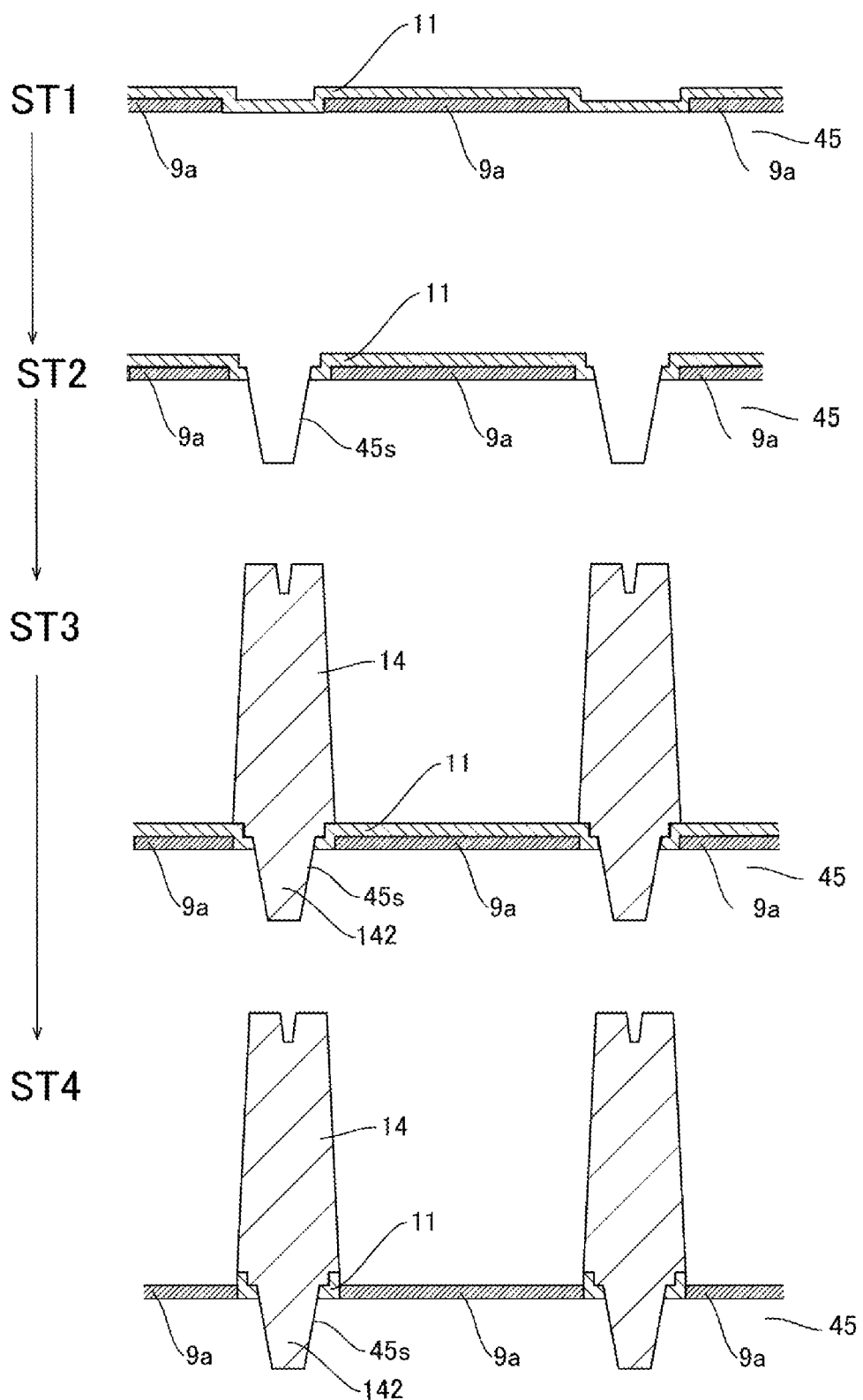
FIG. 7 is cross-sectional views of steps illustrating a method for manufacturing the spacer illustrated in FIG. 6.

FIG. 7 is cross-sectional views of steps illustrating a method for manufacturing the spacer 14 illustrated in FIG. 6. As illustrated in FIG. 6, in order to produce the spacers 14 on the first substrate 10, after forming the pixel electrodes 9a, the insulating protective film 11 made of aluminum oxide or the like is formed in step ST1 illustrated in FIG. 7. Next, in step ST2 illustrated in FIG. 7, the insulating protective film 11 and the interlayer insulating film 45 are etched with the etching mask formed to form the recessed portions 45s. At this time, the insulating protective film 11 functions as an etching stopper to protect the pixel electrodes 9a. Next, in step ST3 illustrated in FIG. 7, after forming the metal film, the metal film is patterned to form the spacers 14. Next, the insulating protective film 11 formed on the outside of the spacer 14 in plan view is removed with an etching solution containing hydrofluoric acid or the like. Thereafter, as illustrated in FIG. 6, the insulating film 17 and the first oriented film 16 are sequentially formed by vapor deposition.

6. Main Effects of the Embodiment

As described above, in the embodiment, since the spacer 14 is made of the metal material, unlike spacers made of resin, problems such as deterioration of the electro-optical layer 80 due to the dissolution of the resin component from the spacer do not occur. In addition, since the spacer 14 is made of the metal material, the situation where the light that has entered the inside of the spacer 14 is reflected at the interface between the side surface of the spacer 14 and the electro-optical layer 80, and emitted in a specific angle direction does not occur. Thus, the decrease in contrast of the image due to the light emitted from the spacer 14 does not occur. In addition, since at least the surface of the spacer 14 is made of the low-reflection material, it is unlikely that the contrast of the image is lowered due to the reflection on the side surface 141 of the spacer 14.

In addition, since the surface of the spacer 14 is covered with the insulating film 17, it is unlikely that the spacer 14 electrically affects the electro-optical layer 80. In addition, since the insulating protective film 11 is provided between the spacer 14 and the pixel electrode 9a, even when the spacer 14 is made of the metal material, it is unlikely that the adjacent pixel electrodes 9a are short-circuited via the spacer 14.

Additionally, since the spacer 14 is made of the metal material, thereby having high strength. In addition, the first substrate 10 is formed with a recessed portion 45s that is recessed toward the substrate body 19 at the position overlapping the spacer 14 in plan view, and the root portion 142 of the spacer 14 is embedded in the recessed portion 45s. For this reason, even when the spacer 14 is not made excessively thick, the spacer 14 is unlikely to be deformed or collapsed. Thus, since the spacer 14 can be made thinner than the width of the wiring such as the data line 6a and the scanning line 3a constituting the light shielding member 18 on the first substrate 10, it is unlikely that the spacer 14 reduces the pixel opening ratio.

Exemplary Embodiment 2

Figure 8:
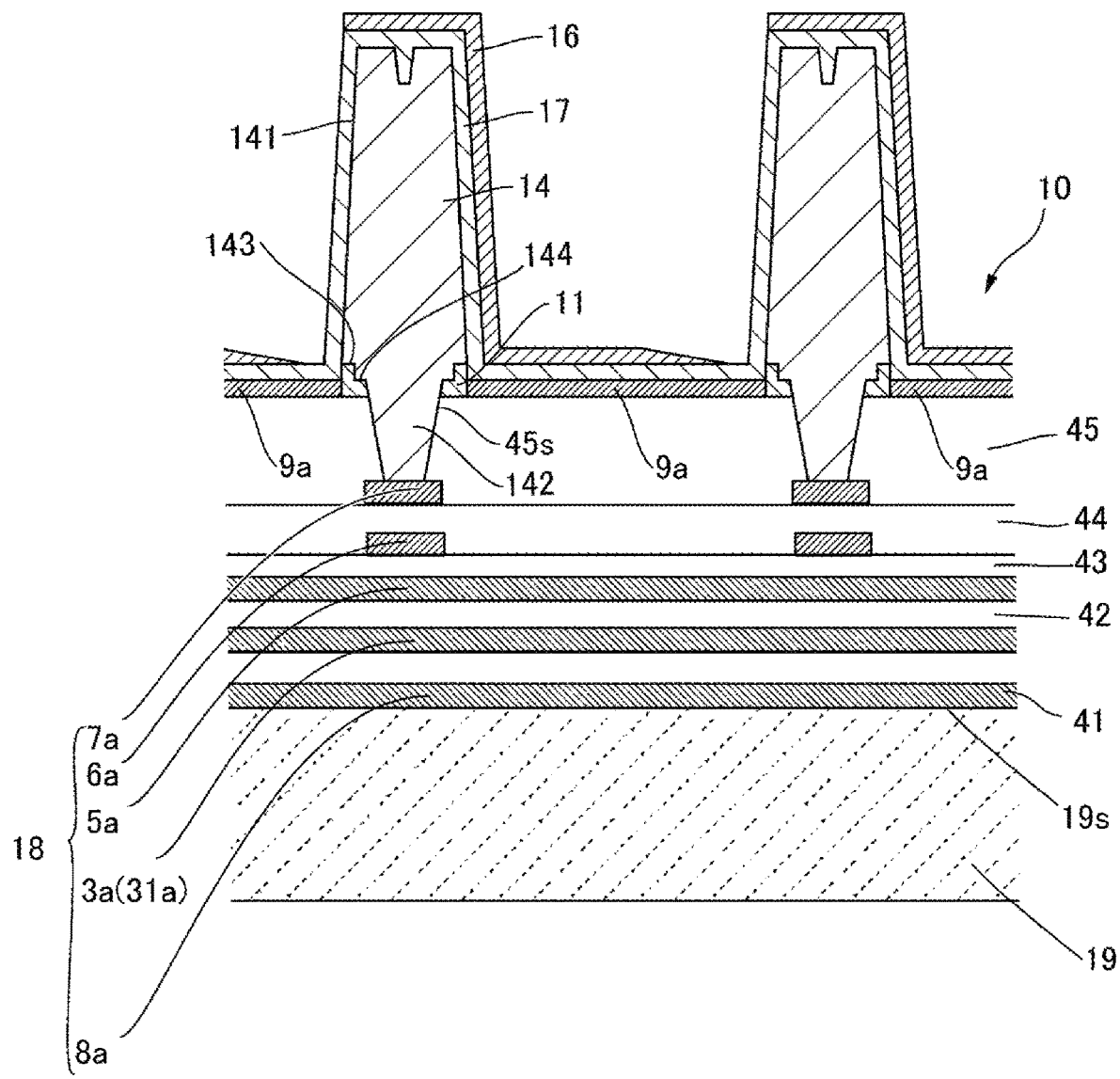
FIG. 8 is an explanatory view of the electro-optical device according to Exemplary Embodiment 2 of the present disclosure.

FIG. 8 is an explanatory view of the electro-optical device 1 according to Exemplary Embodiment 2 of the present disclosure. Note that since the basic configuration of this embodiment, and Exemplary Embodiment 3 and Exemplary Embodiment 4 to be described later is the same as the configuration of Exemplary Embodiment 1, common portions have the same reference symbols and description of the common portions will be omitted.

In Exemplary Embodiment 1, the spacer 14 is electrically in a floating state, but in this embodiment, as illustrated in FIG. 8, the spacer 14 is electrically coupled at the recessed portion 45s to the light shielding layer 7a to which the common potential as the constant potential is applied. For this reason, the common potential is applied to the spacer 14. Thus, in the intersection region 13 where the data line 6a and the scanning line 3a intersect and the vicinity of the intersection region 13, the posture of the liquid crystal molecules 80a can be controlled by the electric lines of force between the pixel electrode 9a and the spacer 14, so that the generation of domains can be suppressed.

Exemplary Embodiment 3

Figure 9:
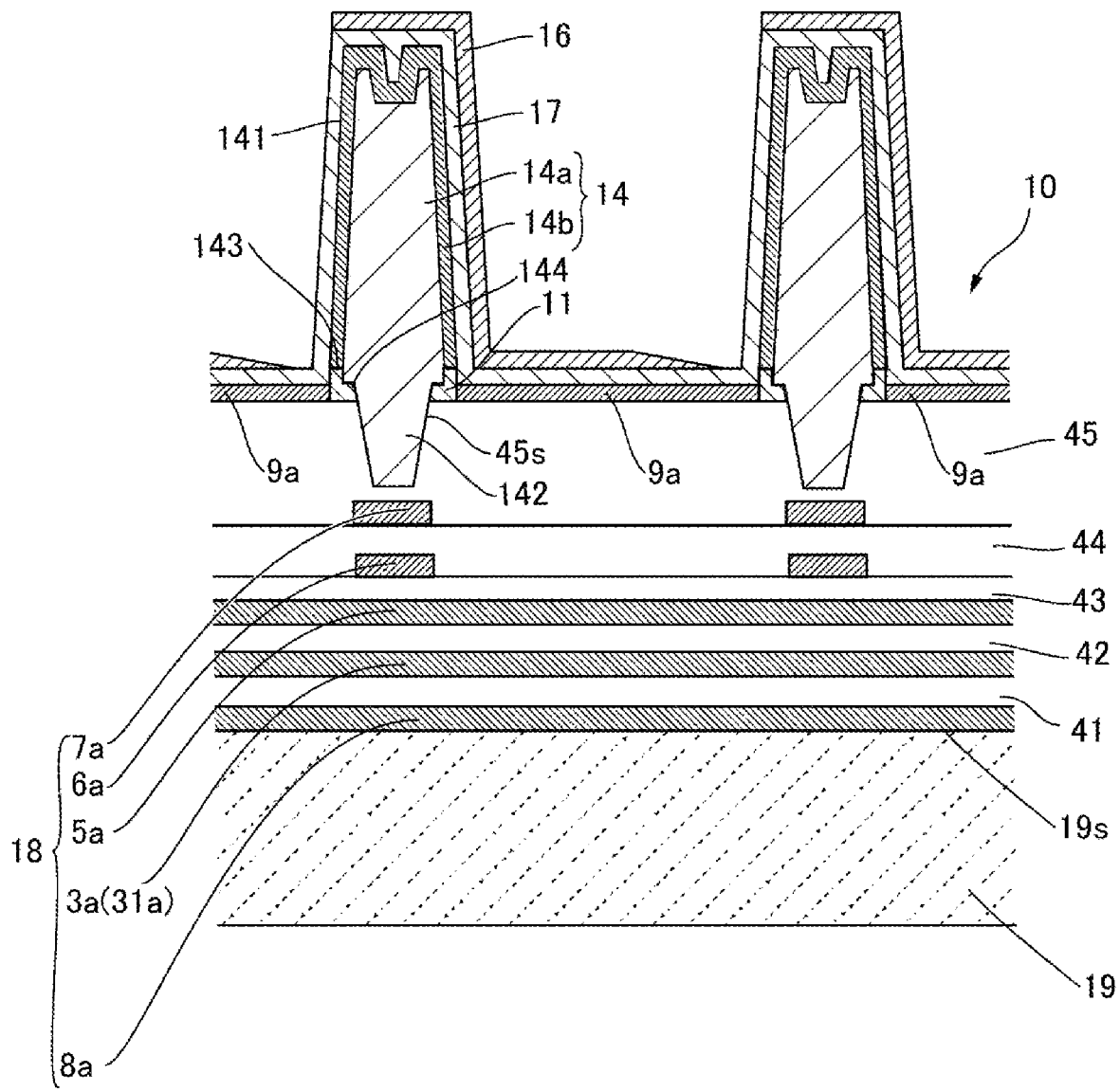
FIG. 9 is an explanatory view of the electro-optical device according to Exemplary Embodiment 3 of the present disclosure.

FIG. 9 is an explanatory view of the electro-optical device 1 according to Exemplary Embodiment 3 of the present disclosure. In Exemplary Embodiment 1, the spacer 14 is made of a single metal material, but in this embodiment, as illustrated in FIG. 9, the spacer 14 includes a core portion 14a made of a first metal material and a layer 14b made of a second metal material covering a surface of the core portion 14a, and the second metal material has a lower reflectance than the first metal material. Thus, the core portion 14a can be made of a metal material having a high reflectance but a high film forming velocity, and the layer 14b can be made of a metal material having a low film forming velocity but low reflectance. For example, the core portion 14a may be made of aluminum or an aluminum alloy, and the layer 14b may be made of titanium nitride.

According to such an aspect, the spacer 14 having a low reflectance on the surface can be efficiently formed. Note that the configuration according to this embodiment may be applied to the electro-optical device 1 according to Exemplary Embodiment 2.

Exemplary Embodiment 4

Figure 10:
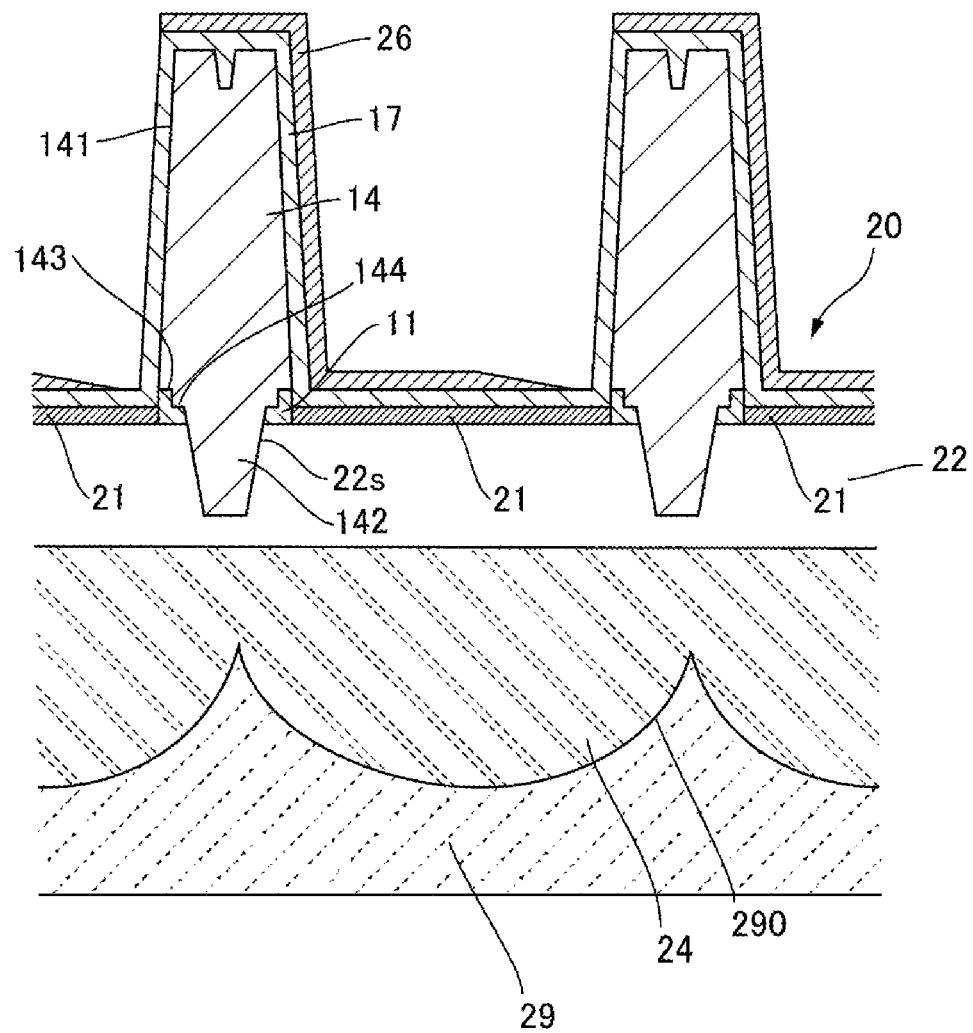
FIG. 10 is an explanatory view of the electro-optical device according to Exemplary Embodiment 4 of the present disclosure.

FIG. 10 is an explanatory view of the electro-optical device 1 according to Exemplary Embodiment 4 of the present disclosure. In the Exemplary Embodiments 1, 2, and 3, the spacer 14 is provided at the first substrate 10, but in this embodiment, the spacer 14 is provided at the second substrate 20, as illustrated in FIG. 10. Such an aspect can be implemented, for example, by forming the common electrode 21, removing the common electrode 21 from the regions where the spacers 14 are disposed, and then sequentially performing the steps ST1, ST2, ST3, and ST4 illustrated in FIG. 7 in this order. In this case, the root portion 142 of the spacer 14 is positioned inside a recessed portion 22s formed on the protective film 22.

Note that when the spacer 14 is provided at the second substrate 20, the configuration described in Exemplary Embodiment 2 and/or 3 may be employed.

Other Exemplary Embodiments

In the above exemplary embodiments, the spacer 14 is prismatic, but the spacer 14 may be cylindrical. In addition, although the spacer 14 is columnar in the above exemplary embodiments, the spacer 14 may have a wall shape extending along the outer edge of the pixel electrode 9a.

In the above exemplary embodiments, although the present disclosure is applied to the electro-optical device employing the VA mode, the present disclosure may be applied to an electro-optical device employing a TN mode, an IPS mode, an FFS mode, and an OCB mode. In the above exemplary embodiments, the liquid crystal device has been described as an example of the electro-optical device, but the electro-optical device of the present disclosure is not limited thereto. For example, the electro-optical device of the present disclosure can also be applied to an image sensor or the like. Further, for example, the present disclosure can be applied to an electro-optical device using a light emitting element such as an organic electro luminescence (EL), an inorganic EL, and a light emitting polymer. Furthermore, the present disclosure can be applied to an electrophoresis display panel using micro capsules containing a colored liquid and white particles dispersed in the liquid.

Electronic Apparatus

Figure 11:
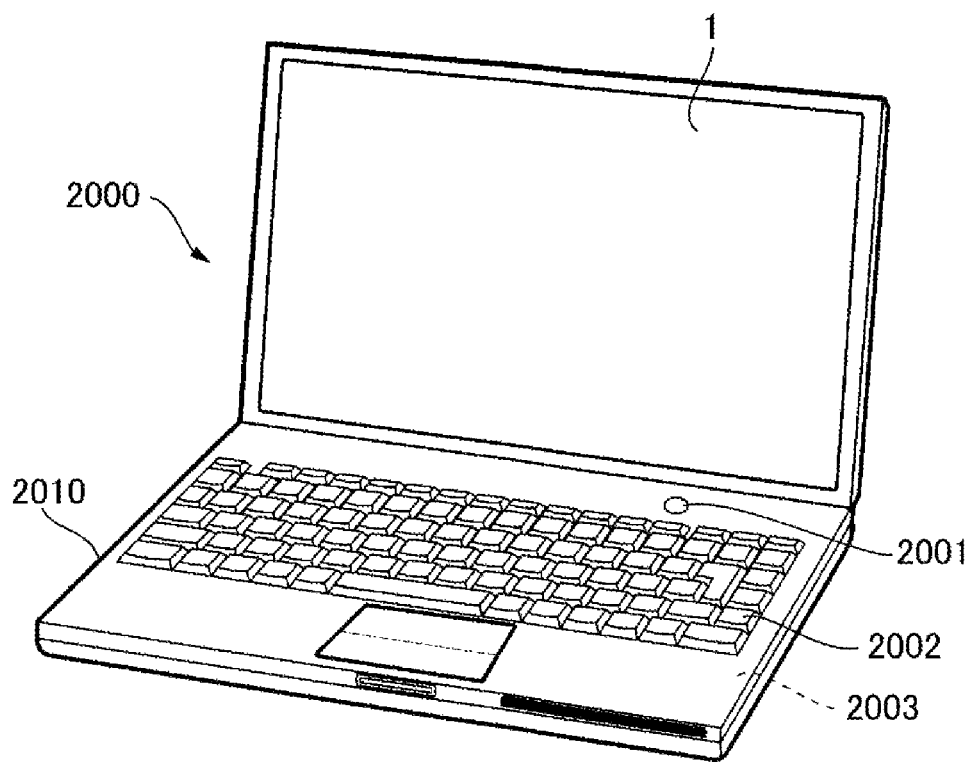
FIG. 11 is a perspective view illustrating a personal computer, which is an example of an electronic apparatus.

The electro-optical device 1 can be used in various electronic apparatuses described below. FIG. 11 is a perspective view illustrating a personal computer 2000, which is an example of the electronic apparatus. The personal computer 2000 includes the electro-optical device 1 for displaying various images, a main body portion 2010 in which a power source switch 2001 and a keyboard 2002 are installed, and a control unit 2003. The control unit 2003 includes, for example, a processor and a memory and controls the operation of the electro-optical device 1.

Figure 12:
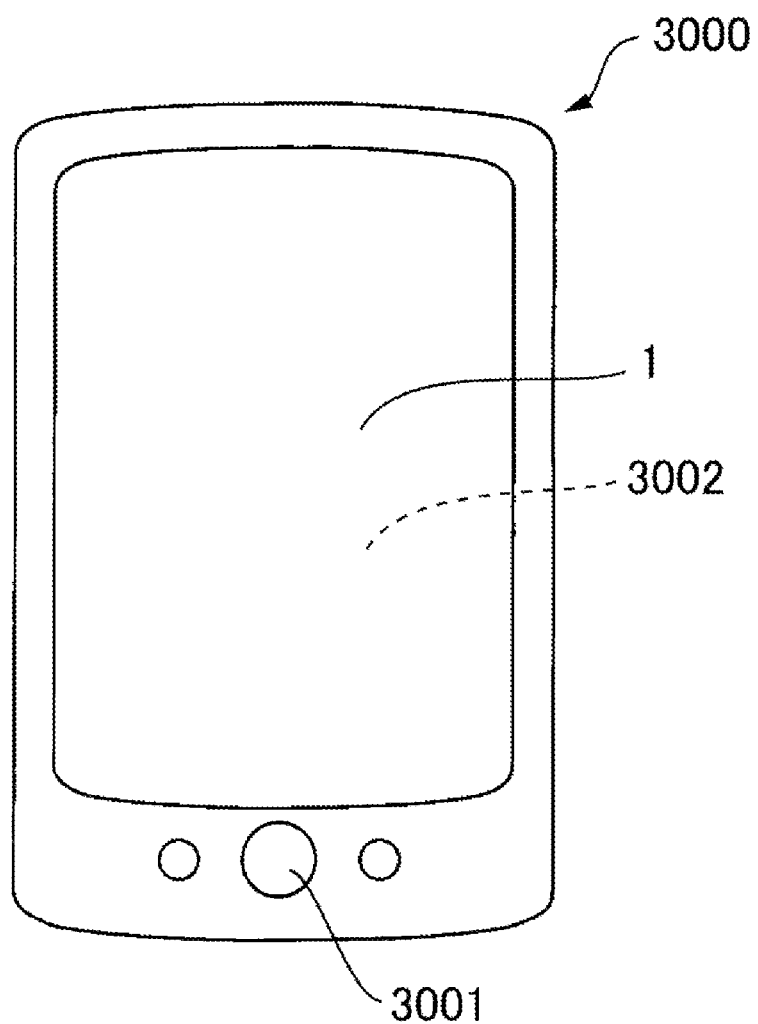
FIG. 12 is a plan view illustrating a smart phone, which is an example of the electronic apparatus.

FIG. 12 is a plan view illustrating a smart phone 3000, which is an example of the electronic apparatus. The smart phone 3000 includes an operation button 3001, the electro-optical device 1 for displaying various images, and a control unit 3002. The screen content that is displayed on the electro-optical device 1 is changed in accordance with the operation of the operation button 3001. The control unit 3002 includes, for example, a processor and a memory and controls the operation of the electro-optical device 1.

Figure 13:
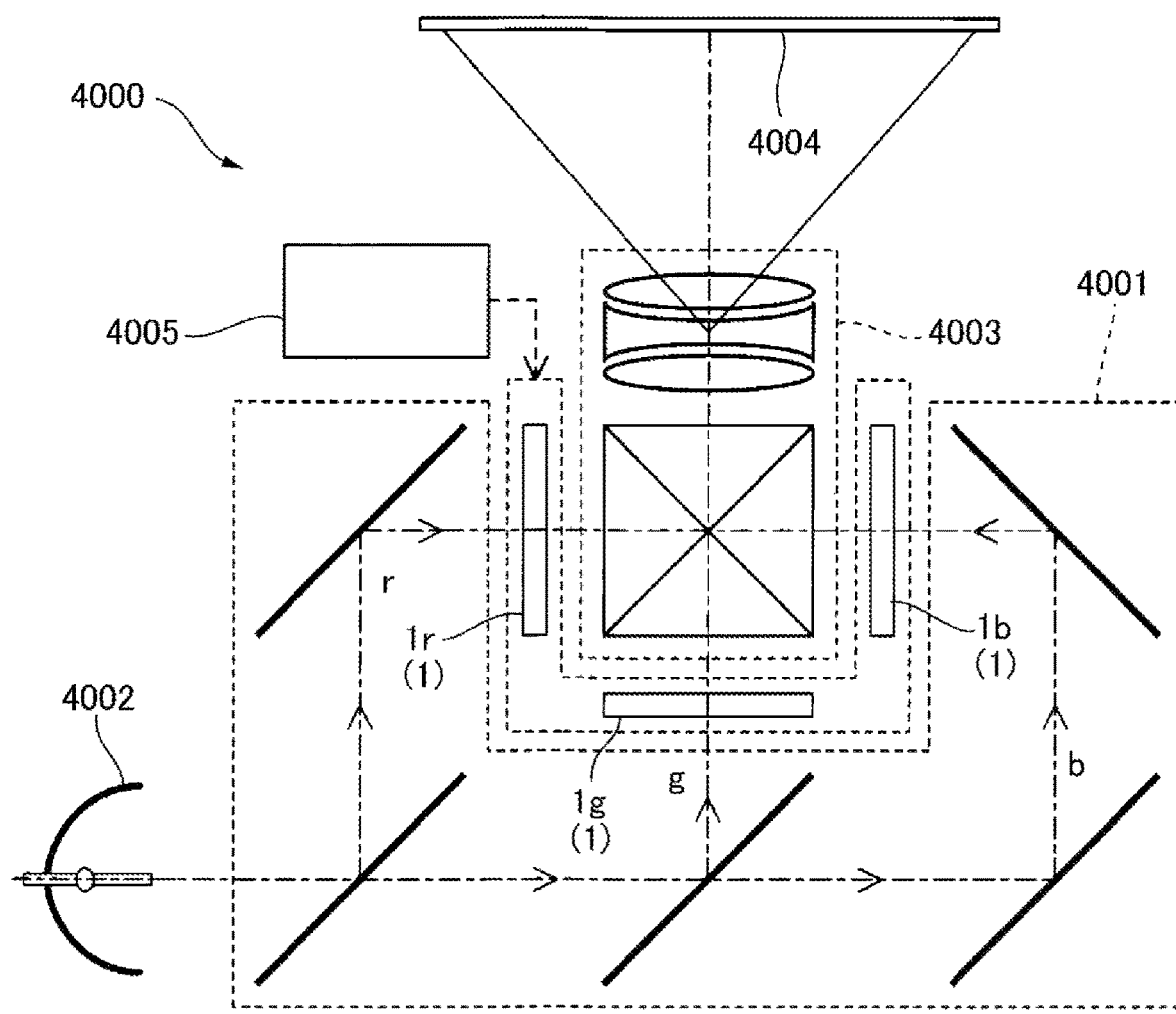
FIG. 13 is a schematic view illustrating a projector, which is an example of the electronic apparatus.

FIG. 13 is a schematic view illustrating a projector, which is an example of the electronic apparatus. The projection display device 4000 is a three-chip projector, for example. An electro-optical device 1r is the electro-optical device 1 corresponding to a red display color, an electro-optical device 1g is the electro-optical device 1 corresponding to a green display color, and an electro-optical device 1b is the electro-optical device 1 corresponding to a blue display color. That is, the projection display device 4000 includes the three electro-optical devices 1r, 1g, and 1b corresponding to the display colors of red, green, and blue, respectively. A control unit 4005 includes, for example, a processor and a memory and controls the operation of the electro-optical devices 1.

An illumination optical system 4001 supplies a red component r to the electro-optical device 1r, supplies a green component g to the electro-optical device 1g, and supplies a blue component b to the electro-optical device 1b, of light emitted from an illumination device 4002, which is a light source. Each of the electro-optical devices 1r, 1g, and 1b functions as an optical modulator, such as a light bulb, that modulates each monochromatic light supplied from the illumination optical system 4001 according to a display image. A projection optical system 4003 combines the light emitted from each of the electro-optical devices 1r, 1g, and 1b and projects the combined light onto a projection surface 4004.

Note that the electronic apparatuses to which the electro-optical device of the present disclosure is applied are not limited to the exemplified apparatuses, and for example, include, projection head-up displays (HUD), direct view head-mounted displays (HMD), personal digital assistants (PDA), digital still cameras, televisions, video cameras, car navigation devices, on-vehicle indicators, electronic organizers, electronic papers, calculators, word processors, workstations, videophones, point of sale (POS) terminals. Further, the electronic apparatuses to which the present disclosure is applied include printers, scanners, copiers, video players, and devices including a touch panel.

The present disclosure has been described above based on the preferred exemplary embodiments, but the present disclosure is not limited to the exemplary embodiments described above. In addition, the configuration of each component of the present disclosure may be replaced with any configuration that exerts the equivalent functions of the above-described embodiments, and to which any configuration may be added.

What is claimed is:

1. An electro-optical device comprising:
a first substrate including a plurality of pixel electrodes;
a second substrate facing the first substrate;
an electro-optical layer disposed between the first substrate and the second substrate;
a spacer made of a metal material protruding, at a position overlapping with a portion between adjacent pixel electrodes among the plurality of pixel electrodes at one substrate of the first substrate and the second substrate, toward another substrate; and
an insulating film covering a surface of the spacer,
wherein the one substrate is the first substrate,
wherein the spacer overlaps a part of the pixel electrode in plan view, and
an insulating protective film is provided between the spacer and the part of the pixel electrode.

2. The electro-optical device according to claim 1, wherein at least the surface of the spacer is made of a low-reflection material.

3. The electro-optical device according to claim 2, wherein the spacer is made of titanium nitride.

4. The electro-optical device according to claim 2, wherein the spacer includes a core portion made of a first metal material and a layer made of a second metal material having a lower reflectance than the first metal material and covering a surface of the core portion.

5. The electro-optical device according to claim 4, wherein the first metal material is aluminum or an aluminum alloy, and the second metal material is titanium nitride.

6. The electro-optical device according to claim 1, wherein the one substrate is provided with an oriented film overlapping the spacer with the insulating film interposed between the spacer and the oriented film.

7. The electro-optical device according to claim 6, wherein
the oriented film is formed of a diagonally vapor-deposited film.

8. The electro-optical device according to claim 1, wherein
the one substrate is provided with a recessed portion that is recessed toward a substrate body of the one substrate, and
a root portion of the spacer is embedded in the recessed portion.

9. An electro-optical device comprising:
a first substrate including a plurality of pixel electrodes;
a second substrate facing the first substrate;
an electro-optical layer disposed between the first substrate and the second substrate;
a spacer made of a metal material protruding, at a position overlapping with a portion between adjacent pixel electrodes among the plurality of pixel electrodes at one substrate of the first substrate and the second substrate, toward another substrate; and
an insulating film covering a surface of the spacer,
wherein the one substrate is the first substrate,
wherein the spacer is electrically coupled to wiring provided with a constant potential, at the first substrate.

10. An electro-optical device comprising:
a first substrate including a plurality of pixel electrodes;
a second substrate facing the first substrate,
an electro-optical layer disposed between the first substrate and the second substrate;
a spacer made of a metal material protruding, at a position overlapping with a portion between adjacent pixel electrodes among the plurality of pixel electrodes at one substrate of the first substrate and the second substrate, toward another substrate; and
an insulating film covering a surface of the spacer,
wherein
the one substrate is the second substrate,
the spacer overlaps a part of a common electrode provided at the second substrate in plan view, and
an insulating protective film is provided between the spacer and the part of the common electrode.

11. An electronic apparatus, comprising:
the electro-optical device according to claim 1.

* * * * *